(12) United States Patent
Perraud et al.

(10) Patent No.: US 7,885,355 B2
(45) Date of Patent: Feb. 8, 2011

(54) MULTI-DYNAMIC MULTI-ENVELOPE RECEIVER

(75) Inventors: Laurent Claude Perraud, Acton, MA (US); Robert Gyorgy Egri, Wayland, MA (US)

(73) Assignee: Cobham Defense Electronic Corp, Bolton, MA (US)

( * ) Notice: Subject to any disclaimer, the term of this patent is extended or adjusted under 35 U.S.C. 154(b) by 679 days.

(21) Appl. No.: 11/872,262

(22) Filed: Oct. 15, 2007

(65) Prior Publication Data
US 2009/0097601 A1    Apr. 16, 2009

(51) Int. Cl.
H04L 27/00    (2006.01)
(52) U.S. Cl. ...................................................... 375/316
(58) Field of Classification Search ............... 375/142, 375/143, 144, 148, 150, 152, 316, 343, 346; 455/63.1, 114.2, 278.1, 296
See application file for complete search history.

(56) References Cited

U.S. PATENT DOCUMENTS

| 6,335,660 | B1 | 1/2002 | Frecassetti et al. | |
|---|---|---|---|---|
| 2004/0196921 | A1 | 10/2004 | Matsumoto et al. | |
| 2005/0017802 | A1 | 1/2005 | Robinson | |
| 2005/0197068 | A1* | 9/2005 | Gumm | 455/67.11 |
| 2009/0068974 | A1* | 3/2009 | Smith | 455/304 |

OTHER PUBLICATIONS

Harker, B.J., et al., "Dynamic Range Enhancements in Radar Systems," Roke Manor Research Limited, http://www.roke.co.uk, Unclassified, 2005.

Harker, B.J., et al., "Dynamic Range Enhancements in Radar Systems," Roke Manor Research Limited, http://www.roke.co.uk, 2006.

Jae-Hee Han and Sangwook Nam, "Power amplifier linearisation using post-distortion error canceller based on complex envelope transfer characteristics," Electronics Letters, Sep. 14, 2000, vol. 36, No. 19, pp. 1665-1666.

Targonski, D., et al., "Design of Wide-Band Aperature-Stacked Patch Microstrip Antennas," IEEE Transactions on Antennas and Propagation, vol. 46, No. 9, Sep. 1998, pp. 1245-1251.

Gao, Steven (Shichang), et al., "Dual-Polarized Broad-Band Microstrip Antennas Fed by Proximity Coupling," IEEE Transactions on Antennas and Propagation, vol. 53, No. 1, Jan. 2005, pp. 526-530.

Ghorbani, K., et al., "Dual Polarized Wide-Band Antennas Aperture Stacked Antennas," IEEE Transactions on Antennas and Propagation, vol. 52, No. 8, Aug. 2004, pp. 2171-2174.

* cited by examiner

*Primary Examiner*—Sam K Ahn
(74) *Attorney, Agent, or Firm*—Jaeckle Fleischmann & Mugel LLP

(57) ABSTRACT

The present invention is a system and a method of filtering a signal at a receiver, the signal having at least a desired channel and blockers. A first converter converts a first copy of the signal resulting in a relatively narrow band, high-resolution first signal. A second converter converts a second copy of the signal resulting in a relatively wide band, low-resolution second signal. Once each copy of the signal is converted, the copies are passed to a combiner. At the combiner, the two copies of the signal are analyzed and the desired channel is extracted from the first copy of the signal by removing any inter-modulation product caused by any interference detected in the second copy from the blockers (not detected in the first copy).

20 Claims, 3 Drawing Sheets

MULTI-DYNAMIC MULTI-ENVELOPE RECEIVER

FIELD OF INVENTION

The present invention is directed toward radio communications, and more specifically toward enhancing the dynamic range of radio communication systems.

BACKGROUND OF INVENTION

As wireless communications become more digitized, the number of multiple users utilizing the same air space for wireless communications is increasing greatly. In these environments where multiple users are utilizing the same air space, individual communication links are using different frequency channels. For a single user to receive only his communication occurring in one channel, (e.g., the desired channel) the user would ideally employ a perfect filter (i.e., infinite selectivity and zero loss). This perfect filter would allow a user to select only the desired channel, i.e., suppressing all undesired frequency channels, and then perform reception operation, such as amplification, frequency mixing, sampling and digitization. However, in real implementations, filter performance is always a trade-off between loss and selectivity. As a result, filtering and reception are always inter-mixed, to compensate for the signal quality loss associated with filters. The signal is filtered through a low-selectivity, low-loss filter to isolate the desired channel partially, then amplified, then filtered again with medium-selectivity-medium-loss filter to isolate the desired channel further, and amplified again. This process of filtering and amplifying is repeated until appropriate selectivity is achieved, while maintaining minimum levels of loss and noise.

However, reception operations (e.g., amplification, frequency mixing) are also implemented according to their own trade-off: mainly noise versus linearity. When the first filtering step is not selective enough, very large signals located at undesired frequency channels, hereinafter referred to as blockers, may still reach the first amplifying stage and complicate the design and function of this stage. Any blocker reaching the first amplifying stage may be folded into the desired channel by the nonlinearity of the receiver as an inter-modulation product.

FIG. 1 illustrates an exemplary waveform diagram showing a received frequency spectrum at a receiver. Large peaks 104 and 105 represent two potential blockers. Peak 110 contains desired channel 106. Receivers described in the prior art filter out the shorter peaks along with most of blocker 104, by cutting a narrow band (represented by the small bandwidth and High resolution indicators) from the spectrum containing the desired channel 106. A small portion of the blockers remain, however, in the narrow band, and its inter-modulation product 109 is folded onto desired channel 106. When the desired message is decoded, that portion of the message will be degraded or even become non-decodable. For example, in a wireless communication system, such as a cellular telephone network, the communication may be interrupted.

This problem is known as the frequency selective dynamic range problem. Traditionally, improvements are achieved either through higher filter selectivity at constant loss or through better linearity of the reception operation. Therefore, there is a need to improve design trade-offs to reduce the need for highly-selective filters while also reducing the linearity requirements of the reception operations such that a desired channel is digitized not only with minimum inter-modulation, but also with minimum computational overhead. The present invention fulfills this need among others.

SUMMARY OF THE INVENTION

The present invention relates to a system and a method for performing post distortion processing in the receiver, using an efficient digitization of signals leading to the decoding of the desired portion of the signal while suppressing the inter-modulation products generated by blocker signals. Specifically, the present invention recognizes that digitizing the entire signal—including blockers that may be located across a large frequency band—at high resolution is not only impractical given current hardware limitations, but also inefficient. That is, to cancel a given amount, for example 30 dB, of inter-modulation products inside the desired channel, the resolution required on the blockers that originated the inter-modulation products need to be only of about the same amount, for example 30 dB. Therefore a reception with one unique dynamic range from the highest level of the blockers to the lowest level set by the resolution required to decode the desired signals is unnecessary.

The present invention exploits this difference in resolution needs by digitizing the received signal at two or more levels of resolution, also known as quantization. Specifically, the relatively narrow band containing the desired portion of the signal is digitized at relatively high resolution suitable for decoding, while the broader band containing undesired components of the blocker jamming the signal are digitized at lower resolution suitable for extracting undesired signals. Once the undesired signals are extracted, they can be used to calculate the inter-modulation products and perform cancellation on the desired frequency channel. It is important to note that the calculation of the inter-modulation product is performed using high-resolution signal-processing, i.e., the non-linear transfer function from the blockers to the inter-modulation product within the desired frequency channel must be known with high resolution.

Accordingly, the invention is a method for performing post distortion processing on a signal by converting the undesired components at low resolution and the desired signal at high resolution. In a preferred embodiment, the method comprises: (a) converting a first portion of a signal within a certain frequency band containing both the desired portion of the signal and the inter-modulation products to be cancelled to form a relatively narrow band, high-resolution first converted signal; (b) converting a second portion of the signal including undesired components outside the frequency band that generated the inter-modulation products to form a relatively wide band, low-resolution second converted signal; and (c) extracting the desired component from the first converted signal by removing any inter-modulation products based on the undesired component derived from the second converted signal.

DETAILED DESCRIPTION OF PREFERRED EMBODIMENTS

Figure 1:
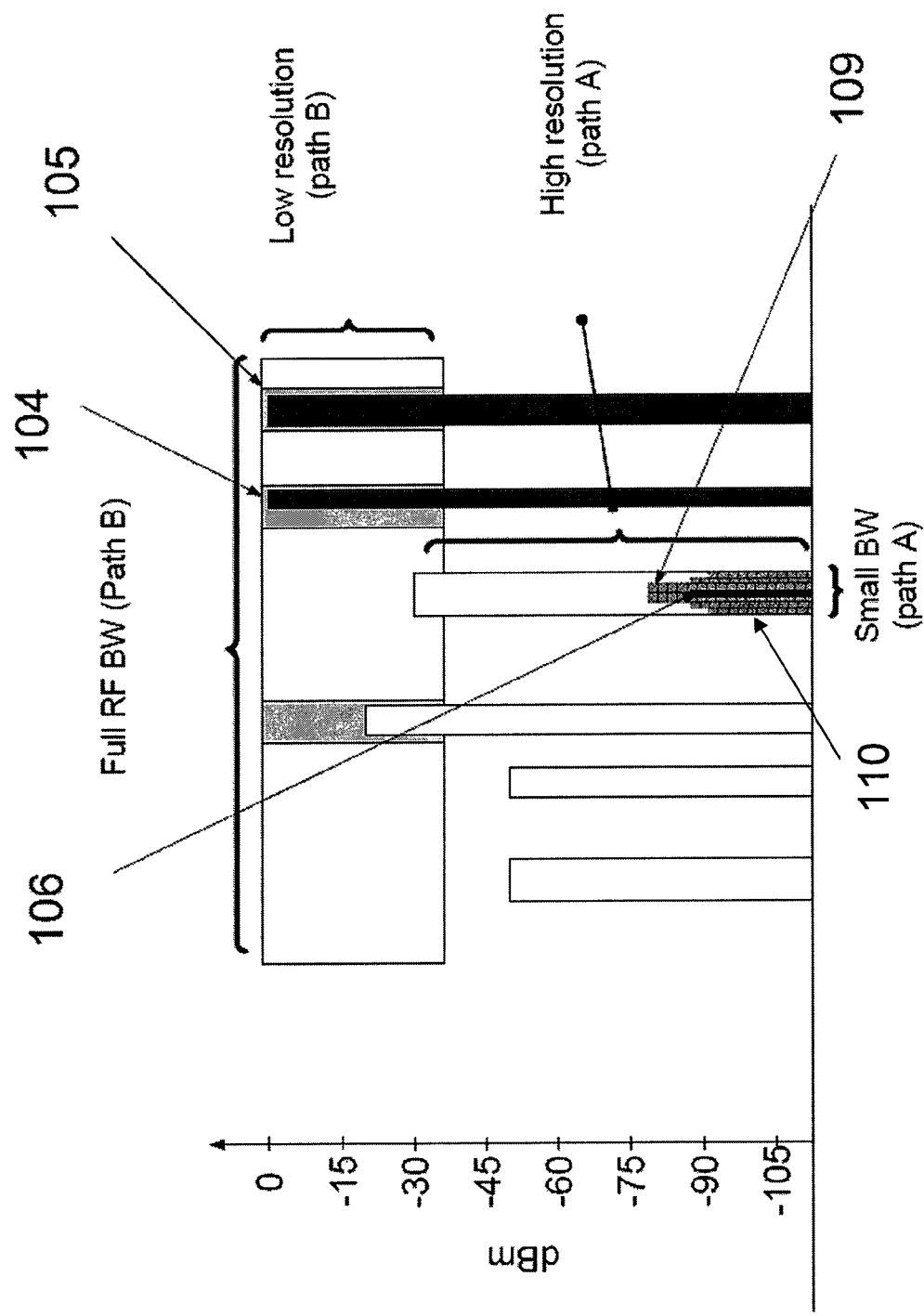
FIG. 1 is a diagram of a sample waveform.
Figure 2:
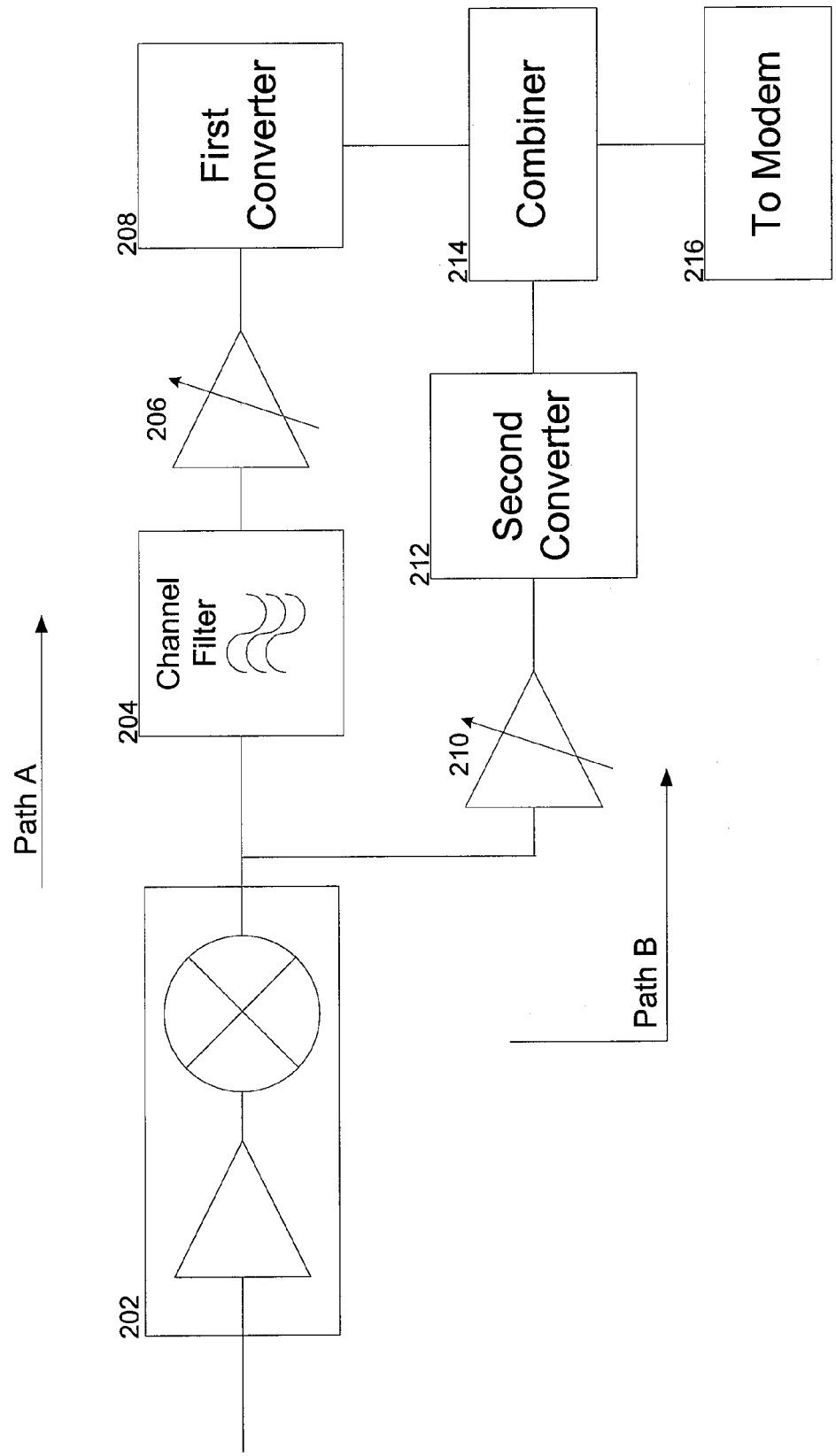
FIG. 2 is a block diagram of a receiver used to filter signals according to principles of the present invention.

The present invention is a method of performing post distortion processing on a signal at a receiver to improve the linearity of the demodulator, a process that also improves the probability of the signal being decoded correctly. The signal comprises two main components, (1) a desired channel and (2) blockers, as shown in FIG. 1. The desired channel is contained within a certain, narrow frequency band. The blockers can appear anywhere in the received frequency spectrum. Once the signal is received, a portion of the signal containing the desired channel follows a first path, labeled Path A in FIGS. 2 and 3, where it is converted to a narrow band, high-resolution digital signal. Path A is non-linear, narrow band, containing the digital signal of the desired channel, and whose fidelity must be preserved with high-resolution, but the signal on Path A also contains the inter-modulation products generated by the blockers. After conversion this signal does not include the blockers by themselves. Similarly, a second portion of the signal containing the blockers follows a second path, labeled Path B in FIGS. 2 and 3, where it is converted to a wide band but low-resolution sampled and digitized signal. Once the two portions are converted, the desired channel is extracted from the first portion of the signal by removing any inter-modulation products based on the blockers derived from the second portion of the signal.

It should be appreciated that the process is segregated into these steps for illustrative purposes and the invention is not limited by the categorization of these steps. For example, one step could be divided into separate steps or one or more steps may be combined into a single step. Additionally, unless otherwise stated, the sequence of these steps may be altered.

Figure 3:
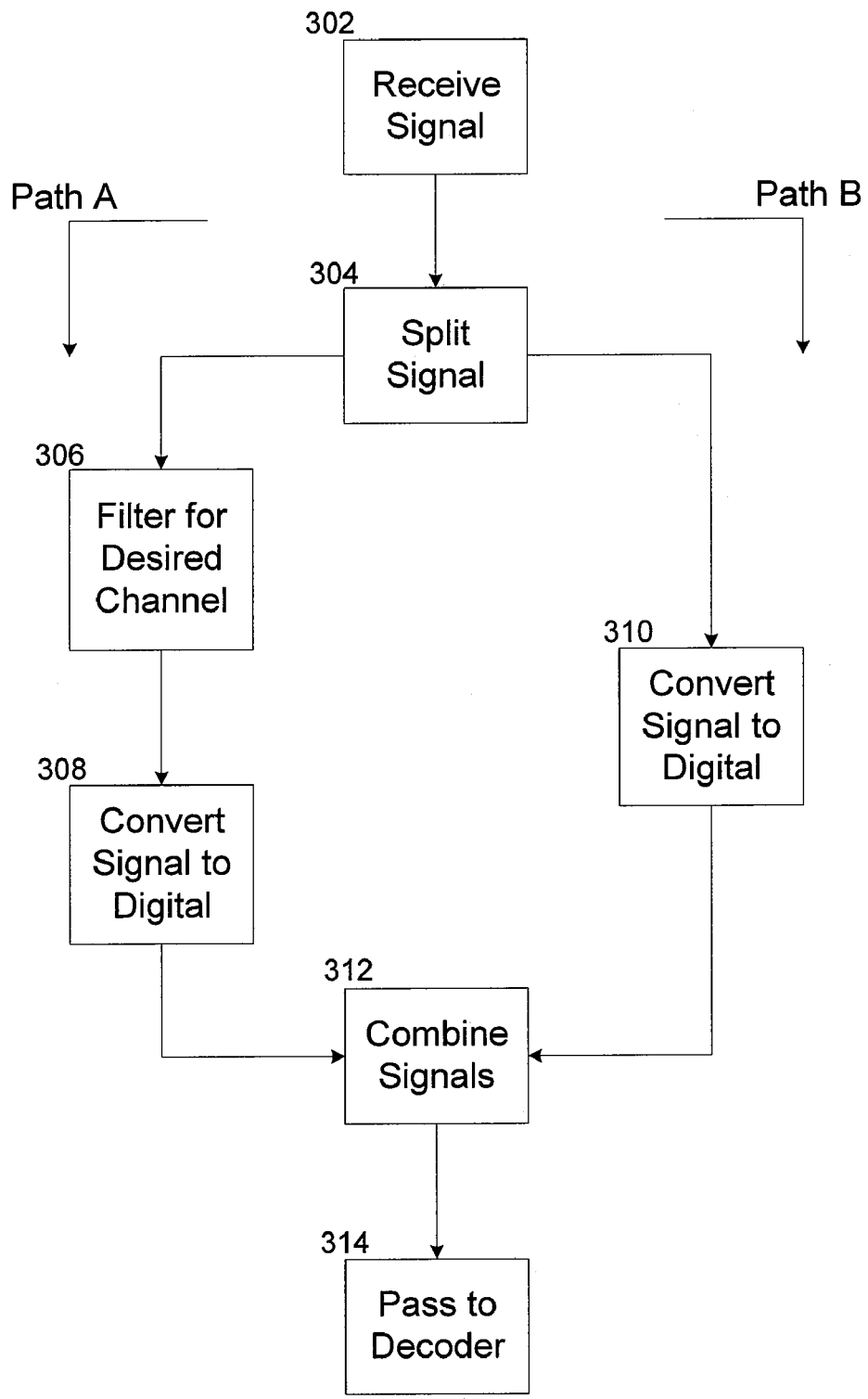
FIG. 3 is a flow chart illustrating one embodiment of the present invention.

Now referring to FIG. 3, a flow chart illustrating the process steps of one embodiment of the present invention is shown. Initially, a signal (e.g., the signal illustrated in FIG. 1) is received in step 302. Once the signal is received, any preprocessing is performed and the process proceeds to step 304. At step 304, the signal is split into a first and a second copy. The first copy of the signal follows Path A as shown similarly in FIG. 2. The process proceeds to step 306 where the first copy of the signal is filtered to isolate a band containing the desired channel such as the portion of the signal in FIG. 1 represented by band 110. Once the first copy of the signal is filtered, the process proceeds to step 308.

At step 308, the filtered first copy of the signal is converted from analog to digital within a relatively narrow band at a high-resolution resulting in a narrow band, high-resolution first converted signal. FIG. 1 illustrates this narrow band, high resolution signal with indicators "Small BW (path A)" and "High resolution (path A)". Generally, a narrow band is typically about 20-40 MHz in size. This produces a band that can be quickly and accurately digitized at high-resolution. It should be understood, however, that, as technological advances are made in the area of analog to digital conversion and processing, a wider band could be utilized and still produce a digital signal with high-resolution. Similarly, high-resolution is typically about 10-16 bit resolution. At a relatively narrow band, this produces a high quality signal when converted with a high likelihood of being successfully decoded. In a preferred embodiment, the narrow band, high-resolution converted signal is a 20 MHz band at 14 bit resolution. Since the desired channel is contained within the narrow band, a higher resolution conversion results in a more accurate representation of the desired channel after decoding.

While the first copy of the signal is converted into the first converted signal, the second copy of the received signal follows Path B to step 310. At step 310, the second copy of the signal is converted from analog to digital within a wide band at a relatively low-resolution. FIG. 1 illustrates this wide band, low resolution signal with indicators "Full RF BW (Path B)" and "Low resolution (path B)". This is done to produce a digitalized signal with a higher likelihood of identifying blockers that are located outside of the narrow band converted above.

As shown in FIG. 1, blockers can occur over a large range of frequencies. However, current hardware limitations limit the resolution at which a wide band can be converted. Thus, a lower resolution is used in the conversion of the wide band resulting in a much larger band being converted than the narrow band. For example, the wide band can be about 25 to about 50 times larger than the narrow band. This provides a low-resolution signal indicating only noise signals. Since only large blockers are causing inter-modulation products large enough to perturb decoding of the desired signal, and since only low resolution is required to calculate the inter-modulation product, a lower resolution can be used than for the narrow band. For example, a resolution about 1.5 to about 2.5 times lower than the resolution of the narrow band can be used for the wide band.

Generally, a wide band is typically about 500 MHz to about 1 GHz in size. This produces a band that includes any blockers that may be surrounding the desired component. It should be understood, however, that as technological advances are made in the area of analog to digital conversion and processing as well as transmission frequencies, a larger wide band can be utilized to ensure that any interference surrounding a desired signal is faithfully represented. Similarly, low-resolution is approximately about 4 to about 6 bits of resolution. At a relatively wide band, this produces a low quality signal when converted that still includes enough information to calculate with sufficient accuracy the inter-modulation product to be suppressed. It should be understood that as technological advances are made in the area of analog to digital conversion and processing, higher resolutions can be utilized while still converting a relatively wide band. In a preferred embodiment, the wide band, low-resolution second converted signal is a 1 GHz band at 6-bit resolution. This provides a band wide enough to ensure that the blocker components are included while still having high enough resolution in order to calculate the inter-modulation products.

To achieve the conversions described above, various hardware configurations may be used. For example, referring to FIG. 2, a schematic of a preferred circuit 201 for performing a preferred process of the present invention is shown. The process filters a signal at a receiver to extract the desired channel. More specifically, the signal comprises at least a desired channel and blockers as discussed before with respect to FIG. 1. The desired channel contains information intended for the receiver and is within a certain bandwidth range, for example 100 MHz to 125 MHz. The non-linearity of the reception process creates from the blockers a portion within the bandwidth containing the desired channel inter-modulation products.

Initially, the signal is received at Mixer 202 from an antenna (not shown). At Mixer 202, any necessary preprocessing is performed. Also at Mixer 202, the signal illustrated in FIG. 1 is created. Of specific interest to the present invention is the folding of inter-modulation product 109 onto the desired channel 106. Once the signal is preprocessed, the signal is split into two copies. A first copy of the signal is forwarded along path A where it is filtered at Channel Filter 204 to focus the bandwidth of the signal to a single band, for example 100 MHz to 125 MHz, as shown by band 110 in FIG. 1. After filtering, the first copy of the signal is forwarded to Amplifier 206 where the first copy of the signal is amplified. After amplification, the first copy of the signal is forwarded to First Converter 208. Here, the first copy of the signal is converted to a relatively-narrow band, high-resolution first converted signal. The first converted signal is focused to include desired channel 106 as well as inter-modulation product 109 from FIG. 1. However, without any knowledge of the blockers outside of band 110 that are contributing to inter-modulation product 109 (such as peaks 104 and 105), inter-modulation product 109 can not be completely removed from band 110 to leave only desired channel 106. Thus, the first converted signal is forwarded to Combiner 214 where it will be further processed with the results of path B to fully remove inter-modulation product 109.

A second copy of the signal is forwarded along path B. As shown, the second copy of the signal is amplified at Amplifier 210 and then forwarded to Second Converter 212. At Second Converter 212, the second copy of the signal is converted to a relatively-wide band, low-resolution second converted signal. Unlike the first signal, the second signal is not focused on any specific frequency band, rather it analyzes a much wider band surrounding the desired component. By doing this, the second converted signal includes information relating to blockers outside the first converted signal, or in this case 104 and 105. After conversion, the second converted signal is forwarded to Combiner 214 for further processing.

Combiner 214 first extracts out of path B the largest blockers which are generating signals 109. Then the combiner calculates 109 and subtracts it from the path A. The resulting signal is the desired component 106 from the first signal that has been converted at a high resolution. Combiner 214 passes desired component 106 to Modem 216 for decoding and further processing.

In preferred circuit 201, first Converter 208, is a narrow band, high-resolution analog to digital converter. Similarly, Second Converter 212, is a wide band, low-resolution analog to digital converter. It would be apparent to one of ordinary skill in the art that additional configurations of converters could be used. For example, if the receiver is a multi-channel receiver, additional narrow band, high-resolution analog to digital converters can be used for each channel used by the receiver. Additionally, as advances in technology are made, different sized bands and different resolutions could be used. A third example of an additional configuration would be a combinational converter that has one input and includes multi-channel, multi-band converting capabilities.

Referring back to FIG. 3, once both copies of the signal are converted, the process proceeds to step 312. Here, the first converted signal and the second converted signal are combined such that the resulting product is desired channel 106. This combination takes the first converted signal as a base signal to be manipulated. Since the narrow band was chosen such that the payload component will be contained in the narrow band, it is easiest to work with to obtain an accurate version of desired channel 106.

Next, the combiner 214 analyzes the second converted signal examining for any possible blockers that could be contributing to an inter-modulation product such as 109 (e.g., peaks 104 and 105). It is to be noted that more than two blockers can be analyzed and more than one inter-modulation product (such as 109) can be cancelled. Any detected blockers are then isolated. When canceling for third order inter-modulation, pairs of blockers are used to calculate their inter-modulation product falling in the desired band. Once these inter-modulation products are calculated, they can be removed from the inter-modulation product of the first converted signal.

One possible procedure the combiner can use is to manipulate the two copies of the signals according to a predetermined algorithm to extract the desired signal. One example of such an algorithm to be used by the combiner is:

$$ex: \gamma \cdot \epsilon_1(t) \cdot \overline{\epsilon_1(t)}$$

wherein $\epsilon_1(t)$ is the copy of the first signal produced by path A, $\overline{\epsilon_1(t)}$ is the copy of the second signal produced by path B, and $\gamma$ is a determinable coefficient. The value of coefficient $\gamma$ (or any other coefficients used in similar combining algorithms) is determined through a standard calibration process (e.g., pseudo-random sequence calibration used in signal linearization), resulting in a removal of intermodulation products. It should be realized that this algorithm is given by way of example only, and one of ordinary skill in the art would realize other ways of performing the combination of the two signal copies, e.g., a filter bank used to further process the copies of the two signals until only the desired signal remains.

By eliminating these inter-modulation products, the resulting signal (i.e., the result of the above algorithm) is the desired channel. The process for eliminating the inter-modulation products could also be performed in various manners, for example, by first calibrating a linear transfer function from Path B to Path A, and then by calibrating the non-linear frequency transfer function of the Path A.

Once the desired channel is isolated and any inter-modulation products are subtracted, the process proceeds to step 314 where the desired channel is passed to a decoder for further processing that could include converting the desired channel to speech if in a cellular telephone environment or converting the desired channel to computational data if in a wireless internet environment.

The process described above is shown only by way of example and is not meant to limiting in any manner. It would be obvious to one of ordinary skill in the art to add, remove or combine steps as needed for any individual situation. For example, additional preprocessing or filtering could be performed on a signal before conversion. Similarly, additional post-processing could be performed on the payload component before being sent to the decoder. The invention is only intended to be limited by the claims that follow.

What is claimed is:

1. A method of improving the effective linearity of a receiver that is processing a signal comprising at least a payload component and an interference component, said payload component being within a frequency band, at least a first part of said interference component being outside said frequency band, the method comprising the steps of:
   (a) converting a first portion of said signal inside said frequency band to form a relatively narrow band, high-resolution first converted signal;
   (b) converting a second portion of said signal including said noise component outside said frequency band to form a relatively wide band, low-resolution second converted signal; and
   (c) extracting said payload component from said first converted signal using said interference component derived from said second converted signal to form a filtered signal.

2. The method of claim 1 wherein a frequency band ratio of said first converted signal and said second converted signal is in the range of 1:25 to 1:50.

3. The method of claim 2 wherein a resolution ratio of said first converted signal and said second converted signal is in the range of 1.5:1 to 2.5:1.

4. The method of claim 1, wherein said first converted signal is a 20 MHz band at 14 bits resolution.

5. The method of claim 4, wherein said second converted signal is a 1 GHz signal at 6 bits resolution.

6. The method of claim 1, wherein step (a) is performed using a first converter comprising a narrow band/low sampling rate, high-resolution analog to digital converter, and step (b) is performed using a second converter comprising a wide band/high sampling rate, low-resolution analog to digital converter.

7. The method of claim 1, wherein said interference component comprises a second part inside said frequency band, said second part being converted by said first converter.

8. The method of claim 7, wherein said extracting comprises at least extracting said second part of said interference component from said first converted signal.

9. The method of claim 8, wherein said extracting comprises subtracting said second part of said interference component detected in said second converted signal from said first converted signal to leave said payload component in said filtered signal.

10. The method of claim 1, wherein said receiver is in a wireless communication device.

11. A system for improving linearity of the receiver, whose received signal comprises at least a payload component and an interference component, said payload component being within a frequency band, at least a first part of said interference component being outside said frequency band, the system comprising:
(a) a first converter for converting a first portion of said signal inside said frequency band to form a relatively narrow band, high-resolution first converted signal;
(b) a second converter for converting a second portion of said signal including said interference component outside said frequency band to form a relatively wide band, low-resolution second converted signal; and
(c) a combiner connected to both said first converter and said second converter, said combiner for extracting said payload component from said first converted signal using said interference component derived from said second converted signal to form a filtered signal.

12. The system of claim 11 wherein a frequency band ratio of said first converted signal and said second converted signal is in the range of 1:25 to 1:50.

13. The system of claim 12 wherein a resolution ratio of said first converted signal and said second converted signal is in the range of 1.5:1 to 2.5:1.

14. The system of claim 11, wherein said first converted signal is a 20 MHz band at 14 bits resolution.

15. The system of claim 14, wherein said second converted signal is a 1 GHz signal at 6 bits resolution.

16. The system of claim 11, wherein said first converter comprises a narrow band, high-resolution analog to digital converter and said second converter comprises a wide band, low-resolution analog to digital converter.

17. The system of claim 11, wherein said interference component comprises a second part inside said frequency band, said second part being converted by said first converter.

18. The system of claim 17, wherein said extracting comprises at least extracting said second part of said interference component from said first converted signal.

19. The system of claim 18, wherein said extracting comprises subtracting said interference component detected in said second converted signal from said first converted signal to produce said payload component.

20. The system of claim 11, wherein said receiver is in a wireless communication device.

* * * * *